US008843169B2

(12) United States Patent
Navda et al.

(10) Patent No.: US 8,843,169 B2
(45) Date of Patent: Sep. 23, 2014

(54) SIGNAL-AWARE DATA TRANSFER IN CELLULAR NETWORKS

(75) Inventors: Vishnu Navda, Bangalore (IN); Ramachandran Ramjee, Bangalore (IN); Sahil Suneja, Toronto (CA); Ananth Balashankar, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 13/567,096

(22) Filed: Aug. 6, 2012

(65) Prior Publication Data

US 2014/0038656 A1 Feb. 6, 2014

(51) Int. Cl.
H04B 7/00 (2006.01)
(52) U.S. Cl.
USPC ..... 455/509; 455/450; 455/452.2; 455/67.11; 455/67.13; 455/63.1; 370/329; 370/395.4; 370/435; 370/448; 370/341; 709/223; 709/238
(58) Field of Classification Search
USPC ........ 455/509, 452.2, 67.11, 67.13, 63.1, 450
See application file for complete search history.

(56) References Cited

U.S. PATENT DOCUMENTS

| | | | |
|---|---|---|---|
| 6,526,295 B1 | 2/2003 | Shull | |
| 7,397,803 B2 * | 7/2008 | Love et al. | 370/395.4 |
| 8,041,403 B2 * | 10/2011 | Almalki | 455/574 |
| 8,117,299 B2 * | 2/2012 | Narayanaswami et al. | 709/224 |
| 8,213,951 B2 * | 7/2012 | Brisebois et al. | 455/452.2 |
| 8,233,463 B2 * | 7/2012 | Yang | 370/338 |
| 8,345,616 B2 * | 1/2013 | Navda et al. | 370/329 |
| 8,417,812 B1 * | 4/2013 | Gulati et al. | 709/224 |
| 8,428,225 B2 * | 4/2013 | Cioffi et al. | 379/32.01 |
| 8,437,361 B2 * | 5/2013 | Guo et al. | 370/433 |
| 8,442,542 B2 * | 5/2013 | Brisebois et al. | 455/450 |
| 8,514,794 B2 * | 8/2013 | Zhang et al. | 370/329 |
| 8,665,724 B2 * | 3/2014 | Stanwood et al. | 370/235 |
| 2010/0172274 A1 | 7/2010 | Wu et al. | |
| 2011/0004678 A1 | 1/2011 | Rothrock | |
| 2012/0009890 A1 | 1/2012 | Curcio et al. | |

OTHER PUBLICATIONS

Aggarwal, et al., "Stratus: Energy-Efficient Mobile Communication using Cloud Support", Retrieved at <<http://www.cs.umd.edu/~schulman/docs/sigcomm10-stratus.pdf>>, Proceedings of ACM SIGCOMM Demo Session, Aug. 2010, pp. 1-2.

Gupta, et al., "Power Consumption and Conservation in WiFi Based Phones: A Measurement-Based Study", Retrieved at <<http://www.cs.ucdavis.edu/~prasant/pubs/conf/secon-07.pdf>>, Acm/Usenix MobiSys, Jun. 19, 2006, p. 220-232.

(Continued)

Primary Examiner — Marceau Milord
(74) Attorney, Agent, or Firm — Dan Choi; Judy Yee; Micky Minhas

(57) ABSTRACT

Described herein are various technologies pertaining to scheduling data transfer between a mobile computing device and a base station in a cellular network. A signal quality value for a signal over which data is to be transferred is computed, and transfer of data is scheduled based upon the signal quality value. If the signal quality value is above a threshold, a wireless radio of the mobile computing device is caused to commence data transfer or continue data transfer. If the signal quality value is below the threshold, and the data need not be immediately transferred, then the wireless radio is caused to transition to an idle state or remain in an idle state.

20 Claims, 6 Drawing Sheets

(56) References Cited

OTHER PUBLICATIONS

Naik, Kshirasagar, "A Survey of Software Based Energy Saving Methodologies for Handheld Wireless Communication Devices", Retrieved at <<https://ece.uwaterloo.ca/~snaik//energy.pdf>>, Oct. 2010, pp. 1-46.

Astély, et al., "A Future Radio-Access Framework", Retrieved at http://ieeexplore.ieee.org/stamp/stamp.jsp?tp=&arnumber=1603722>>, IEEE Journal on Selected Area in Communication, vol. 24, No. 3, Mar. 2006, pp. 693-706.

Ananthanarayanan, et al., "StarTrack: A Framework for Enabling Track-Based Applications", Retrieved at <<http://www.cs.berkeley.edu/~ganesha/StarTrack_final.pdf>>, In Proceedings of the 7th International Conference on Mobile Systems, Applications and Services, pp. 207-220.

"Power Consumption and Energy Efficiency Comparisons of WLAN Products", Retrieved at <<http://www.atheros.com/media/resource/resource_15_file2.pdf>>, In White paper of Atheros Communications, Apr. 2004, pp. 1-17.

Balasubramanian, et al., "Energy Consumption in Mobile Phones: A Measurement Study and Implications for Network Applications", Retrieved at <<http://ciir-publications.cs.umass.edu/getpdf.php?id=904>>, In Proceedings of the 9th ACM SIGCOMM Conference on Internet Measurement Conference, Nov. 4, 2009, pp. 280-293.

Chiang, et al., "Power Control in Wireless Cellular Networks", Retrieved at <<http://www.princeton.edu/~chiangm/powercontrol.pdf>>, Proceedings: In Foundations and Trends in Networking, vol. 2, Issue 4, Apr. 2008, pp. 1-168.

Constandache, et al., "Towards Mobile Phone Localization without War-Driving", Retrieved at <<http://ieeexplore.ieee.org/stamp/stamp.jsp?tp=&arnumber=5462058>>, In Proceedings of the 29th Conference on Information Communications, Mar. 14, 2010, p. 1-9.

Constandache, et al., "EnLoc: Energy-Efficient Localization for Mobile Phones", Retrieved at <<http://ieeexplore.ieee.org/stamp/stamp.jsp?tp=&arnumber=5062218>>, In Proceedings of the 28th Conference on Computer Communications, Apr. 19, 2009, pp. 2716-2720.

Feeney, et al., "Investigating the Energy Consumption of a Wireless Network Interface in an Ad Hoc Networking Environment", Retrieved at <<http://ieeexplore.ieee.org/stamp/stamp.jsp?tp=&arnumber=916651>>, In Proceedings of Twentieth Annual Joint Conference of the IEEE Computer and Communications Societies, Apr. 22, 2001, pp. 1548-1557.

Gustafsson, et al., "Particle Filters for Positioning, Navigation, and Tracking", Retrieved at <<http://ieeexplore.ieee.org/stamp/stamp.jsp?tp=&arnumber=978396>>, In IEEE Transactions on Signal Processing, vol. 50, No. 2, Feb. 2002, p. 425-437.

Krumm, et al., "Predestination: Where Do You Want to Go Today?", Retrieved at <<http://ieeexplore.ieee.org/stamp/stamp.jsp?tp=&arnumber=4160237>>, Proceedings: In IEEE Computer Magazine, vol. 40, Issue 4, Apr. 2007, pp. 105-107.

Kushner, et al., "Convergence of Proportional-Fair Sharing Algorithms under General Conditions", Retrieved at http://ieeexplore.ieee.org/stamp/stamp.jsp?tp=&arnumber=1310314>>, In IEEE Transactions on Wireless Communications, vol. 3, No. 4, Jul. 2004, pp. 1250-1259.

Lamarca, et al., "Place Lab: Device Positioning Using Radio Beacons in the Wild", Retrieved at <<http://research.microsoft.com/pubs/64611/pervasive-placelab-2005-final.pdf>>, In Proceedings of the Third International Conference on Pervasive Computing, May 8, 2005, pp. 1-20.

Liu, et al., "Mobility Modeling, Location Tracking, and Trajectory Prediction in Wireless ATM Networks", Retrieved at http://ieeexplore.ieee.org/stamp/stamp.jsp?tp=&arnumber=709453>>, In IEEE Journal on Selected Areas in Communications, vol. 16, No. 6, Aug. 1998, pp. 922-936.

Liu, et al., "Experiences in a 3G Network: Interplay between the Wireless Channel and Applications", Retrieved at <<http://citeseerx.ist.psu.edu/viewdoc/download?doi=10.1.1.142.8214&rep=rep1&type=pdf>>, In Proceedings of the 14th ACM International Conference on Mobile Computing and Networking, Sep. 14, 2008, pp. 211-222.

Mihaylova, et al., "Mobility Tracking in Cellular Networks Using Particle Filtering", Retrieved at <<http://ieeexplore.ieee.org/stamp/stamp.jsp?tp=&arnumber=4350309>>, In IEEE Transactions on Wireless Communications vol. 6, Issue 10, Oct. 2007, pp. 3589-3599.

Nicholson, et al., "BreadCrumbs: Forecasting Mobile Connectivity", Retrieved at <<http://www.eecs.umich.edu/techreports/cse/2008/CSE-TR-541-08.pdf>>, In Proceedings of the 14th ACM International Conference on Mobile Computing and Networking, Sep. 14, 2008, pp. 1-14.

Pollini, Gregory P., "Trends in Handover Design", Retrieved at <<http://ieeexplore.ieee.org/stamp/stamp.jsp?tp=&arnumber=486807>>, In IEEE Communications Magazine, vol. 34, Issue 3, Mar. 1996, pp. 82-90.

Rahmati, et al., "Context-for-Wireless: Context-Sensitive Energy-Efficient Wireless Data Transfer", Retrieved at <<http://www.ruf.fice.edu/~mobile/publications/rahmati07mobisys.pdf>>, In Proceedings of the 5th International Conference on Mobile Systems, Applications and Services, Jun. 11, 2007, pp. 165-178.

Sharma, et al., "Cool-Tether: Energy Efficient On-the-fly WiFi Hotspots using Mobile Phones", Retrieved at <<http://citeseerx.ist.psu.edu/viewdoc/download?doi=10.1.1.150.912&rep=rep1&type=pdf>>, In Proceedings of the 5th International Conference on Emerging Networking Experiments and Technologies, Dec. 1, 2009, pp. 109-120.

Tan, et al., "An Empirical Study on 3G Network Capacity and Performance", Retrieved at <<http://ieeexplore.ieee.org/stamp/stamp.jsp?tp=&arnumber=4215760>>, In Proceeding of IEEE International Conference of Computer Communication, May 6, 2007, pp. 1514-1522.

Tripathi, et al., "Handoff in Cellular Systems", Retrieved at <<http://ieeexplore.ieee.org/stamp/stamp.jsp?tp=&arnumber=736475&userType=inst>>, In IEEE Personal Communications, Dec. 1998, pp. 26-37.

* cited by examiner

SIGNAL-AWARE DATA TRANSFER IN CELLULAR NETWORKS

BACKGROUND

Relatively recently, mobile telephones have been configured to support voice communications as well as applications that require receipt and transmittal of data by way of a network connection. For example, currently mobile telephones are equipped with applications that support text messaging, e-mailing, instant messaging, web browsing, and the like. Furthermore, cellular networks are continuously being updated to support applications executing on mobile computing devices that request relatively large amounts of data at a relatively high throughput rate. For example, mobile telephones are being configured to execute applications for streaming high definition video for presentation to a user on a display of the mobile computing device. Similarly, mobile computing devices can be configured to execute gaming applications, wherein a user of a first mobile computing device is participating in a game with a user of a second mobile computing device in real-time, thereby requiring a relatively large amount of data to be transmitted by way of a cellular network to each of the mobile computing devices.

While processing capabilities, display resolution, chipsets, and other hardware of mobile computing devices has evolved to support applications that consume a relatively large amount of data, such applications also tend to consume a relatedly large amount of energy from batteries that charge the mobile computing devices. For example, if a user is watching a high-definition video on a mobile computing device, a battery that powers such mobile computing device may discharge all of its energy within a few hours. An exemplary protocol that has been employed by manufacturers of mobile computing devices to reduce an amount of energy consumed thereby when communicating with a base station in a cellular network is referred to as fast dormancy. Generally, this protocol allows a wireless radio to be relatively quickly (e.g., 1-3 seconds) placed into an idle state when there is no data being transferred between the mobile computing device and the base station. In current mobile computing devices, however, fast dormancy fails to extend the battery life when a user is uploading or downloading relatively large amounts of data, such as watching high definition video by way of the mobile computing device.

SUMMARY

The following is a brief summary of subject matter that is described in greater detail herein. This summary is not intended to be limiting as to the scope of the claims.

Described herein are various technologies pertaining to reducing an amount of power consumed by a mobile computing device when uploading or downloading data. With more particularity, it has been discovered that quality (strength) of a signal over which data is transferred between a mobile computing device and a base station in a cellular network impacts an amount of energy consumed by the mobile computing device when transferring the data. Therefore, less power is consumed by the mobile computing device when receiving data over a relatively high quality signal when compared to power consumed by the mobile computing device when receiving data over a relatively low quality signal. Thus, a mobile computing device (such as a mobile telephone or tablet computing device) that is configured to transfer data in a cellular network can be configured to monitor qualities (strengths) of respective signals between the mobile computing device and at least one base station in the cellular network over time. Based at least in part upon observed qualities of signals between the mobile computing device and the at least one base station, a threshold signal quality value can be computed. In an exemplary embodiment, the threshold signal quality value can be an absolute value, wherein a signal with a signal quality value above the threshold signal quality value can be deemed as a high-quality signal, while a signal with a signal quality value below the threshold signal quality value can be deemed as a low-quality signal. In another exemplary embodiment, the threshold signal quality value can be a percentile corresponding to a distribution of previously observed signal quality values. In such an embodiment, a signal with a signal quality value that falls, in the distribution, above the percentile can be deemed a high-quality signal, while a signal with a signal quality value that falls, in the distribution, above the percentile can be deemed a low-quality signal. Thus, in an example, the threshold value can be selected to correspond to a 50th percentile of observed signal quality values over some period of time (e.g. 5 min.).

A computer-executable application can be executing on the mobile computing device, wherein the computer-executable application requests a data transfer (an upload or download) by way of the cellular network. In an exemplary embodiment, the application can specify a time deadline, wherein the requested transfer is to be completed prior to the time deadline. For example, the application can specify that the transfer is desirably complete in 30 seconds. In another exemplary embodiment, the deadline can be inferred based upon the rate at which the application consumes data, size of data that is to be transferred, and expected/observed throughput values corresponding to the mobile computing device. For instance, if the application is configured to display high-definition video to a user on a display screen with a particular resolution, and the application requests download of a relatively large file, then the large file can be divided into portions and a respective time deadline can be computed for each portion based upon the bitrate at which the application consumes data and expected throughput rate(s).

A signal quality value for a signal between the mobile computing device and a base station over which data is to be transferred can be computed and compared with the threshold signal value mentioned above. If the signal quality value is above the threshold value, then the wireless radio of the mobile computing device can be activated or caused to remain active, and the requested data transfer can commence or continue. This process can repeat until the data transfer is completed, until the wireless radio has been active for some threshold period of time, or until the signal quality value for the signal falls below the threshold (which may be adapted based upon varying signal quality values). If the signal quality value for the signal over which the data is to be transferred is below the threshold quality value, then the wireless radio of the mobile computing device can be caused to become idle or remain idle.

It can be ascertained that in some situations, the threshold signal quality value may desirably be adapted over time. For example, if the mobile computing device transitions from a first area, where signal strength is relatively high, to a second area, where signal strength is relatively low, it may be desirable to lower the threshold signal quality value. Such adaption allows for signal quality to be determined relative to recently observed signal quality values. Accordingly, using the technologies described herein, data is selectively scheduled for transmittal as a function of signal quality.

Other aspects will be appreciated upon reading and understanding the attached figures and description.

DETAILED DESCRIPTION

Figure 1:
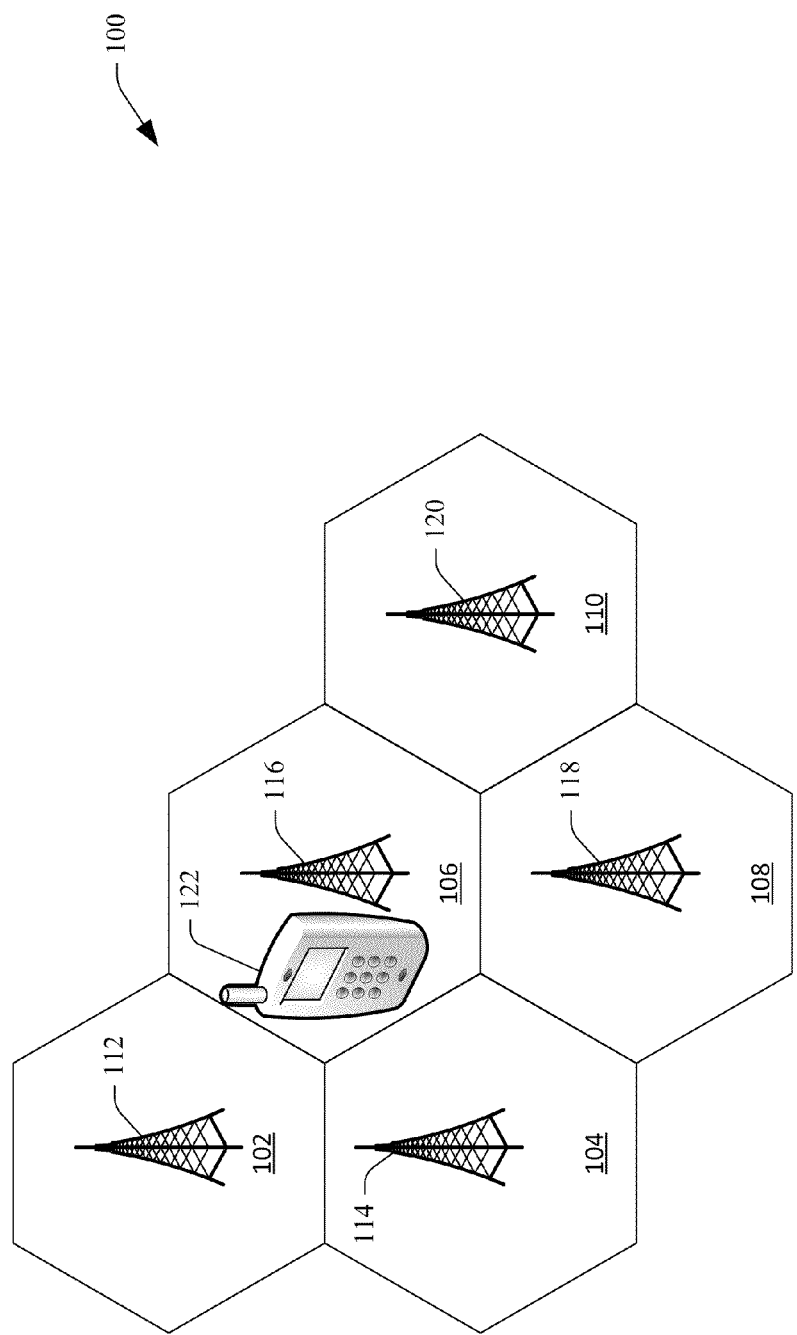
FIG. 1 illustrates an exemplary cellular network.

Various technologies pertaining to scheduling transfer of data in a cellular network based upon signal quality observed at a mobile computing device in the cellular network will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary cellular network 100 is illustrated. The cellular network 100 comprises a plurality of cells 102-110. Each cell in the cellular network 100 comprises a respective base station. Thus, the cellular network 100 comprises a plurality of base stations 112-120 for the respective cells 102-110.

Each cell in the plurality of cells 102-110 represents a geographic area serviced by a respective base station, wherein the respective base station is shown as being centrally located in a respective cell (although the respective base station need not be centrally located). Accordingly, for example, the base station 112 is configured to provide data to computing devices in the cell 102 and receive data from computing devices in the cell 102. Each base station in the plurality of base stations 112-120 is configured to communicate with computing devices by way of signals having differing frequencies. Typically, base stations in adjacent cells transmit data over signals of differing frequencies to avoid signal interference. In some cellular networks, base stations in non-adjacent cells communicate over signals of identical frequencies.

The base stations 112-120 in the cellular network 100 can be configured to communicate by way of various different channel access protocols/techniques including, but not limited to, time division multiple access (TDMA), frequency division multiple access (FDMA), code division multiple access (CDMA), wideband CDMA (W-CDMA), orthogonal frequency division multiple access (OFDMA), amongst others. Additionally, the cellular network 100 can be a 2G network, a 3G network, a 4G network, some other advanced network. Thus, the cellular network 100 is not limited to cellular networks currently in use. Additionally, the cellular network 100 may be a global system for mobile communications (GSM) network, a CDMA network, etc., and can support long-term evolution (LTE) technologies, evolution data optimized (EVDO) technologies, etc. In an exemplary embodiment, the cellular network 100 may support simultaneous voice and data transmissions to computing devices in the cellular network 100. In other embodiments, however, the cellular network 100 may not support simultaneous transmittal of voice and data over a communications channel between a mobile computing device and a base station in the cellular network 100.

The cellular network 100 comprises a mobile computing device 122. For instance, the mobile computing device 122 can be a mobile telephone (a smart phone), a tablet computing device, a laptop computing device (e.g., with an air card), a portable media player that supports cellular network communications, or the like. As shown, the mobile computing device 122 resides in the cell 106 of the cellular network 100. Therefore, at such position, the base station 116 services the mobile computing device 122 (e.g., data is transferred between the mobile computing device 122 and the base station 116). It is to be understood, however, that the mobile computing device 122, over time, may transition to different regions in the cell 106 or transition to another cell in the cellular network 100. Accordingly, the mobile computing device 122 may transition, for instance, from the cell 106 to the cell 104 in the cellular network 100, such that data is transferred over a communications channel established between the mobile computing device 122 and the base station 114.

As will be described in greater detail below, the mobile computing device 122 can execute an application that consumes a relatively large amount of data, such as an application for viewing streaming video in high-definition and/or an application for uploading high-definition video to a web-based server. It has been recognized that an amount of energy utilized when transferring data between the mobile computing device 122 and a base station in the cellular network 100 is a function of quality of signal over which the data is transferred. With more particularity, the higher the quality of the signal between the mobile computing device 122 and a respective base station in the cellular network 100 over which data is transferred, the less energy consumed from a battery of the mobile computing device 122 when performing data transfer. Conversely, the lower the quality of the signal over which data is transferred between the mobile computing device 122 and the respective base station in the cellular network 100, the larger the amount of energy consumed from the battery of the mobile computing device 122 when performing data transfer.

As the mobile computing device 122 transfers to different locations in the cellular network 100, qualities of respective signals over which data is transferred between the mobile computing device 122 and respective base stations in the cellular network 100 can alter. Signal strength between the mobile computing device 122 and a respective base station in the cellular network 100 can depend upon a variety of factors, including distance between the mobile computing device 122 and the respective base station, weather conditions, structures between the mobile computing device 122 and the respective base station (buildings), vegetation between the mobile computing device 122 and the respective base station, etc. As will be described in greater detail below, the mobile computing device 122 is configured to schedule transfer of data between the mobile computing device 122 and a respective base station in the cellular network 100 as a function of a quality (strength) of signal between the mobile computing device 122 and the respective base station relative to historic qualities of signals observed between the mobile computing device 122 and at least one base station in the cellular network 100. Accordingly, when possible, the mobile computing device 122 schedules data transfer when the quality of the signal over which data is being transferred is relatively high while, if possible, refraining from scheduling transfer of data between the mobile computing device 122 and a respective base station in the cellular network 100 when quality of a signal over which data is to be transferred is low. Furthermore, the mobile computing device 122 can be configured to receive an explicit deadline from the application for completing transfer of requested data. In another exemplary embodiment, the mobile computing device 122 can infer a deadline for completing the transfer of the requested data. The mobile computing device 122 can schedule data transfer between the mobile computing device 122 and at least one base station in the cellular network 100 based at least in part upon such deadline.

Figure 2:
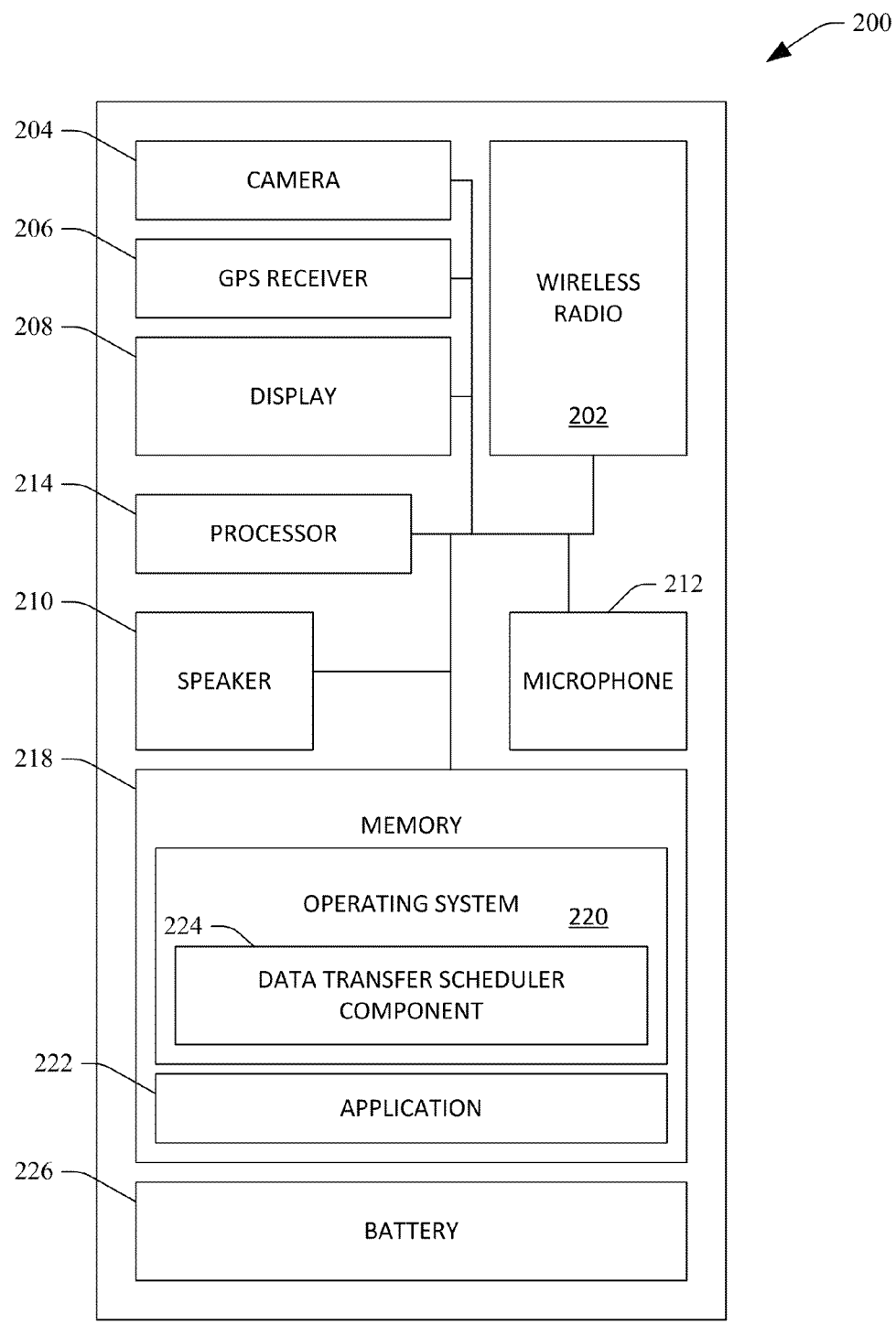
FIG. 2 is a functional block diagram of an exemplary mobile computing device.

Now referring to FIG. 2, a functional block diagram of an exemplary mobile computing device 200 is illustrated. As mentioned above, the mobile computing device 200 can be a mobile telephone, a tablet computing device, or some other mobile computing device that is configured to transfer data over a cellular network. The mobile computing device 200 comprises a wireless radio 202 that is configured to transmit data to and receive data from base stations in a cellular network. For example, the wireless radio 202 may include an integrated circuit or chip that is configured with communications protocols for establishing communications channels with base stations in the cellular network 100.

The mobile computing device 200 may further comprise a camera 204 that includes functionality for capturing digital images. The camera 204 can include a lens, photo sensors, and circuitry that facilitate capturing digital images (still images or video) through utilization of the mobile computing device 200. The mobile computing device 200 may also be equipped with functionality that facilitates gesture-based input of commands to the mobile computing device 200, such as a wave of a hand, pointing, or the like.

The mobile computing device 200 further comprises a GPS receiver 206 that can receive signals from GPS satellites. Accordingly, the GPS receiver 206 can be employed to ascertain geographic location of the mobile computing device 200.

The mobile computing device 200 further includes a display 208. In an exemplary embodiment, the display 208 can be a touch-sensitive display (a multi-touch display) that allows a user to input instructions to the mobile computing device 200 through contacting the display 208 with a finger, multiple fingers/thumbs, or stylus. In an exemplary embodiment, resolution of the display 208 can be sufficiently high as to allow for presentation of high-definition video to a user of the mobile computing device 200.

The mobile computing device 200 may further optionally include a speaker 210 and a microphone 212. The speaker 210 outputs audio signals to a user of the mobile computing device 200, while the microphone 212 receives audio signals from the user of the mobile computing device 200. The microphone 212 can also be employed in connection with voice-recognition, such that a user of the mobile computing device 200 can cause certain functionality to be undertaken on the mobile computing device 200 responsive to receipt of voice commands from a user.

The mobile computing device 200 also includes a processor 214 that is in communication with the aforementioned components of the mobile computing device 200 by way of a bus 216. The mobile computing device 200 further comprises a memory 218 that is accessible to the processor 214 by way of the bus 216, wherein the processor 214 executes instructions in the memory 218 to cause the hardware of the mobile computing device 200 to operate in a desired manner. The processor 214 can be any of a variety of different types of processors, and may refer to a particular core of a multicore processor, a system on chip (SoC) or cluster on chip (CoC) design, an integrated circuit, or the like.

The memory 218 comprises an operating system 220 and an application 222 that is executed by the processor 214. As shown, the application 222 is configured to execute on the mobile computing device 200 with the operating system 220 installed thereon.

The operating system 220 of the mobile computing device 200 includes a data transfer scheduler component 224 that is configured to schedule data transfer between the mobile computing device 200 (by way of the wireless radio 202) and a respective base station in a cellular network based upon quality of a signal between the wireless radio 202 and the respective base station over which data is desirably transferred. While the data transfer scheduler component 224 is shown as being included as a portion of the operating system 220, it is to be understood that the data transfer scheduler component 224 may be implemented in other manners. For example, the data transfer scheduler component 224 can be implemented as a standalone application that is executed by the processor 214. In another exemplary embodiment, the data transfer scheduler component 224 can be implemented as an integrated circuit that is configured to perform scheduling of data transfer in a cellular network. Accordingly, the data transfer scheduler component 224 may be implemented as a field programmable gate array (FPGA) or other suitable circuit.

The mobile computing device 200 additionally comprises a battery 226 that provides energy to the components of the mobile computing device 200. As mentioned above, an amount of energy consumed from the battery 226 when the wireless radio 202 is employed to transfer data between the mobile computing device 200 and a base station in a cellular network is a function of quality of a signal over which such data is transferred. Accordingly, for applications that consume or output a relatively large amount of data, scheduling data transfer such that the transfer occurs over a relatively high quality signal is desirable to conserve energy and, therefore, extend life of the battery 226.

Pursuant to an example, the application 222 may a web browser that includes a video player plug-in that streams data from an Internet server. In another example, the application 222 may be a standalone video application that presents high definition streaming video to a user of the mobile computing device 200 by way of the display 208. In still another example, the application 222 may be an audio application that is configured to stream high-quality audio from an Internet-based server. In yet another exemplary embodiment, the application 222 may be an application that facilitates uploading a relatively large amount of data to a server, such as a video captured by way of the camera 204 on the mobile computing device 200. In still yet another exemplary embodiment, the application 222 may relate to a background data transfer, such as an operating system update, an application download/update, background data syncs, or the like. Other applications that consume or generate relatively large amounts of data that can be executed by the processor 214 of the mobile computing device 200 will be contemplated by one skilled in the art and are intended to fall under the scope of the hereto-appended claims.

Figure 3:
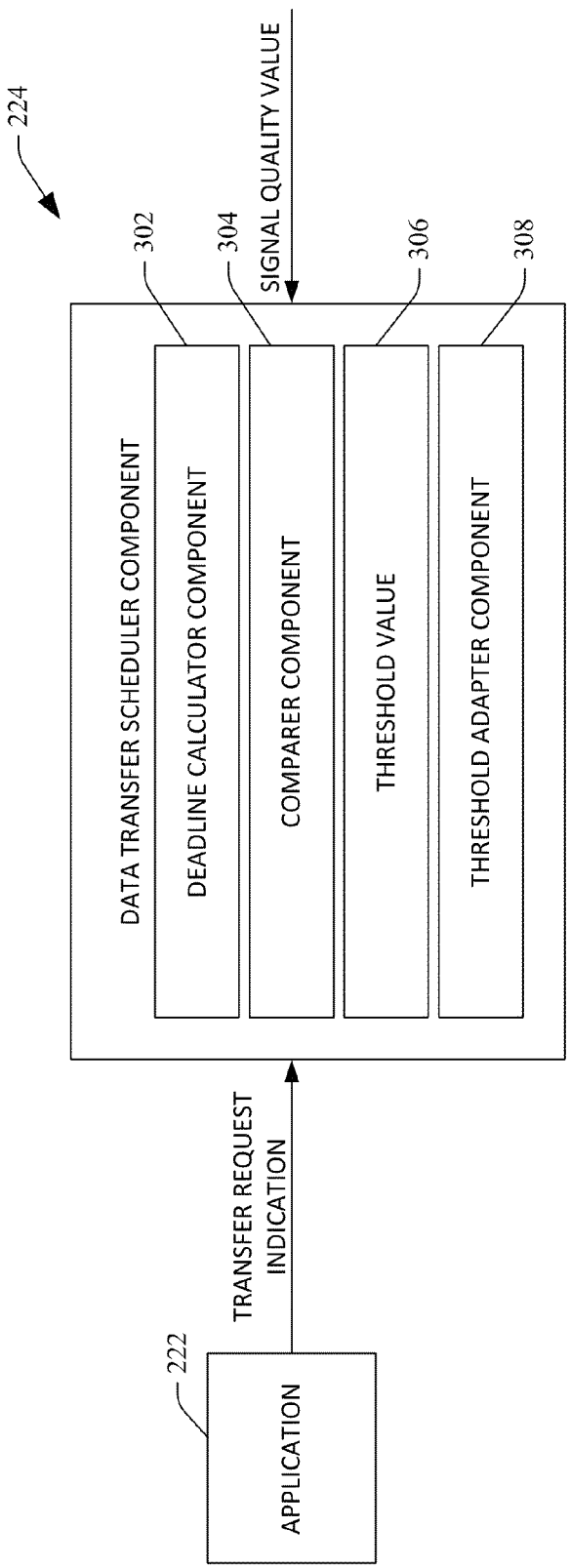
FIG. 3 is a functional block diagram of an exemplary system included in a mobile computing device that facilitates signal-aware data transfer.

With reference now to FIG. 3, the data transfer scheduler component 224 is shown in greater detail. The data transfer scheduler component 224 receives an indication that the application 222 desirably transfers data between the mobile computing device 200 and a respective base station in the cellular network 100. While FIG. 3 illustrates the indication of the transfer request being received directly from the application 222, it is to be understood that the indication of the transfer request may be received, for instance, from the wireless radio 202 and/or the operating system 220.

In an exemplary embodiment, the indication of the transfer request can include an explicit time deadline set forth by the application 222, wherein the application requests the data transfer (upload or download) to be completed prior to the time deadline. In such an embodiment, the application 222 (in the transfer request indication) can specify the time deadline as well as a size (amount) of data that is to be transferred. In another exemplary embodiment, if the application 222 is not configured to explicitly set forth a time deadline, the data transfer scheduler component 224 can include a deadline calculator component 302 that can calculate a time deadline, wherein the data transfer requested by the application 222 is to be completed by such time deadline. As will be described in greater detail below, the deadline calculator component 302 can infer the time deadline based upon a known or estimated data consumption rate of the application 222, size of a portion of data (chunk of data) that is to be transferred, and a known correlation between data throughput rates and signal qualities.

The data transfer scheduler component 224 can further comprise a comparer component 304 that compares the time deadline specified by the application 222 or computed by the deadline calculator component 302 with a current point in time. If a difference between the current point in time and the time deadline is beneath a threshold (the time deadline is close to the current point in time), then the data transfer scheduler component 224 can schedule the wireless radio 202 to become active to transfer the data or remain active such that data transfer continues, regardless if the quality of the signal over which the data is to be transferred. Therefore, for instance, if the time deadline is near, the wireless radio 202 is caused to transfer data subject to the request, thereby causing the data transfer requested by the application 222 to be completed prior to the time deadline.

If, however, the difference between the current time and the time deadline is above the threshold (transfer of data need not immediately occur to allow for the data transfer requested by the application 222 to be completed prior to the time deadline), then the comparer component 304 can compare a signal quality value for a signal over which the transfer is to occur with a threshold value 306, wherein the signal quality value is indicative of quality/strength of a signal between the wireless radio 202 and a respective base station in the cellular network 100. In an exemplary embodiment, the signal quality value can be a signal-to-noise ratio (SNR) for the signal. In another exemplary embodiment, the signal quality value can be a received signal strength indication (RSSI) value. Other measures for evaluating signal quality are also contemplated.

In an exemplary embodiment, the threshold value 306 can be computed based at least in part upon historic signal quality values corresponding to respective signals between the wireless radio 202 and at least one base station in the cellular network 100. Pursuant to an example, the threshold value 306 can be selected to be a median value of the historic signal quality values. In another exemplary embodiment, the threshold value 306 may be a percentile value. In such case, historic signal quality values for respective signals between the mobile computing device 200 and at least one base station in the cellular network 100 can be retained in the form of a distribution, and the threshold value 306 can indicate a position in the distribution. A signal with a signal quality value that falls above the percentile in the distribution can be deemed a "good" signal, while a signal with a signal quality value that falls below the percentile in the distribution can be deemed a "poor" signal. Therefore, for example, the threshold value 306 can indicate that a good signal is one that falls in the 80th percentile of the distribution of historic signal quality values.

The comparer component 304 compares the signal quality value for the signal between the wireless radio 202 and the respective base station (over which data is to be transferred) with the threshold value 306. If the signal quality value is found to be above the threshold value 306 by the comparer component 304, then the data transfer scheduler component 224 can one of cause the wireless radio 202 to become active (and commence transferring the data) or cause the wireless radio 202 to remain active (and continue transferring the data).

If, however, the comparer component 304 finds that the signal quality value is below the threshold value 306 (indicating a relatively poor signal between the wireless radio 202 and the respective base station), then the data transfer scheduler component 224 can cause the wireless radio 202 to one of become idle (and cease the transfer of the data) or remain idle (and continue refraining from transferring the data).

Generally, then, the data transfer scheduler component 224 acts to schedule transfer of data between the mobile computing device 200 and a respective base station in the cellular network 100 when quality of the signal over which the data is transferred is found to be relatively high (the signal is deemed as being a "good" signal), while refraining from scheduling transfer of data over such signal when the quality of the signal is found to be relatively low (the signal is deemed as being a "poor" signal)—unless data must be transferred over the poor signal to meet the explicitly provided or inferred time deadline.

It can be recognized that over time, qualities of signals observed by the mobile computing device 200 can alter as location of the mobile computing device 200 alters in the cellular network 100, as environmental conditions change, or the like. Therefore, a signal that is deemed to be a good signal at a first instance in time based upon its signal quality value may be deemed to be a poor signal at some other point in time, despite having the same signal quality value. Thus, whether a signal is deemed "good" or "poor" can be relative to most recently observed signal qualities. To that end, the data transfer scheduler component 224 can include a threshold adapter component 308 that adapts the threshold value 306 based upon at least one of a threshold number of most recently observed signal quality values or signal quality values observed over a threshold amount of time (e.g. 30 seconds, 2 minutes, 5 min.). The threshold adapter component 308, then, can periodically or from time to time update the threshold value 306 (regardless of whether the threshold value is an absolute value or a percentile).

It can be ascertained that there is inherently some overhead when activating or deactivating the wireless radio 202 on the mobile computing device 200 in accordance with a schedule output by the data transfer scheduler component 224. Specifically, in conventional mobile computing devices, state changes of wireless radios do not occur instantaneously (e.g., state of a wireless radio cannot be changed from active to idle or idle to active instantaneously). Rather, several seconds may be consumed (on the order of 20) to activate and/or deactivate the wireless radio 202 of the mobile computing device 200. In an exemplary embodiment, the data transfer scheduler component 224 and/or the operating system 220 of the mobile computing device 200 can employee a protocol referred to as fast dormancy to reduce the time overhead, and thus reduce energy consumed from the battery 226 when powering the wireless radio 202. Fast dormancy is a device feature that allows the mobile computing device 200 to notify cellular base stations when a radio resource allocated to the device is no longer in use. Effectively, this allows the radio resource to be immediately released (other than waiting for a timeout event). Through application of the fast dormancy protocol, then, the data transfer scheduler component 224 cause the state of the wireless radio 202 to be relatively rapidly altered (e.g., between 1-3 seconds for a state change).

It can be ascertained, however, that there is still some time overhead associated with causing the state of the wireless radio 202 to change from active to idle and vice versa. Therefore, if the data transfer scheduler component 224 determines that the wireless radio 202 should transition from an idle state to an active state, then it may be desirable to leave the wireless radio 202 in an active state for some threshold amount of time, even if quality of a signal changes for the worse. In an example, it may not be desirable to activate the wireless radio 202 and immediately thereafter perform a comparison, ascertain that the signal quality has dropped beneath the threshold 306, and immediately cause the wireless radio 202 to become idle. Such change of state of the wireless radio 202 can result in energy being needlessly discharged from the battery 226. Therefore, a change of state of the wireless radio 202 from active to idle or idle to active may have a threshold amount of time corresponding therewith, such that the wireless radio 202 remains in its current state for at least that threshold amount of time. In an exemplary embodiment, the threshold amount of time may be 2 seconds, 3 seconds or the like.

Additional detail pertaining to the deadline calculator component 302 is now provided. In an exemplary embodiment, the application 222 may be an application that requests streaming video from a web-based service. Accordingly, the application 222 can submit a request to the data transfer scheduler component 224 by specifying a URL where desirably downloaded streaming video is located. The deadline calculator component 302 can infer the time deadline based upon bit rate of the requested video stream. The bit rate is the rate at which the application 222 drains video data from a video buffer. The deadline calculator component 302 can additionally determine a size of the streamlining video file located at the URL, and can divide such video file into multiple data portions (chunks). Additionally, the mobile computing device 200 can maintain a mapping between observed data throughput rates for signals of different signal qualities, which can be employed to estimate data throughput rates. The deadline calculator component 302 can compute a respective time deadline for each data portion based upon a position of a respective data portion in a sequence of data portions that the application 222 consumes, bit rate that the application 222 consumes the data, size of the respective data portion, and expected throughput. In an example, size of data portions can be selected based upon an energy cost of transitioning state of the wireless radio 202 (between idle and active state) as well as average data throughput perceived at the mobile computing device 200. The higher the observed throughput, the larger the size of the data portion—therefore, total data transfer time for a data portion is long enough to amortize the energy overhead. In an exemplary embodiment, size of the data portion can be kept constant for a stream of data, and multiple chunks can be downloaded during a single radio-on duration. Furthermore, for background data transfers, deadlines can be delayed/flexible, as there may be no concept of a hard deadline per data portion (other than average data portion transfer times).

The deadline calculator component 302 can compute time deadlines for individual data portions, such that the data portions are transferred prior to their respective time deadlines. Such data portions can be transferred over the cellular network 100 at a highest rate supported by an application server in order to reduce time and energy utilized for the data transfer. Therefore, in summary, the deadline calculator component 302, when inferring a time deadline for a portion of data, can do so based upon a size of the portion of data and throughput values corresponding to observed signal quality values, as well as a rate at which the application 222 consumes data. It can also be ascertained then that the deadline calculator component 302 can update time deadlines as observed throughput rates change.

Now described is an energy model for a signal threshold. The model is mathematically represented as follows:

$$E_s = (P_s \times T_s) + O_s, \quad (1)$$

where s is a signal threshold, $E_s$ is an expected energy for the signal quality threshold s, $P_s$ is an average power for a signal with signal quality s or higher, $T_s$ is an amount of time required to download a file of a specified size, such that $$T_s = \frac{\text{download size}}{Tp_s},$$

where $Tp_s$ is an average throughput of a signal with signal quality s or higher, $O_s$ is an amount of overhead due to tails, where $O_s = n_s \times E_t$, and where $n_s$ is an expected number of tails and $E_t$ is a tail energy (e.g., approximately 3.2 J). Additionally, $$n_s = \frac{T_s}{Rl_s},$$

where $Rl_s$ is an expected run length for a signal with signal quality s or higher.

A condition to enforce a deadline in the model can be given by the following:

$$T_{sf} = T_s + (n_s \times Tb_s) < T_d, \quad (2)$$

where $T_{sf}$ is an expected time to finish a download of a file of a particular size and with a signal of quality s or higher, $T_s$ is a time required to download the file with the signal of quality s or higher, $Tb_s$ is an expected time between the run-lengths, and $T_d$ is an amount of time left prior to a deadline. Various parameters can affect the model, including a signal smoothening function, history of signal quality, hysteresis (signal threshold slack), signal threshold update frequency, throughput normalization, model update frequency, hysteresis, invalidating signal thresholds, and the like. With respect to signal smoothening functions, instantaneous signal samples have spurious peaks and dips, which can lead to increased chunking. Accordingly, a moving average of instantaneous signals can be employed.

Overhead may also be incurred by requiring the CPU of a mobile computing device to wake up to poll signal quality. To reduce overhead, an amount of time between sampling signal quality can be increased. In another exemplary embodiment, a model in the mobile computing device can asynchronously interrupt the CPU when signal quality goes above a pre-specified threshold. In other words, the CPU can go to sleep, if not performing other tasks, to avoid polling signal quality values. This can be accomplished by computing, at runtime, a current signal threshold based upon a deadline and data transfer time, as well as an amount of time until a potential threshold change. The modem can thereafter be configured with a signal threshold, and the CPU can go to sleep (e.g., low power idle mode). If signal quality goes above the threshold, the CPU is awoken, and data transfer is initiated. Otherwise, if the time until the next threshold change expires, the CPU wakes up and performs the above-referenced computations again.

Figure 4:
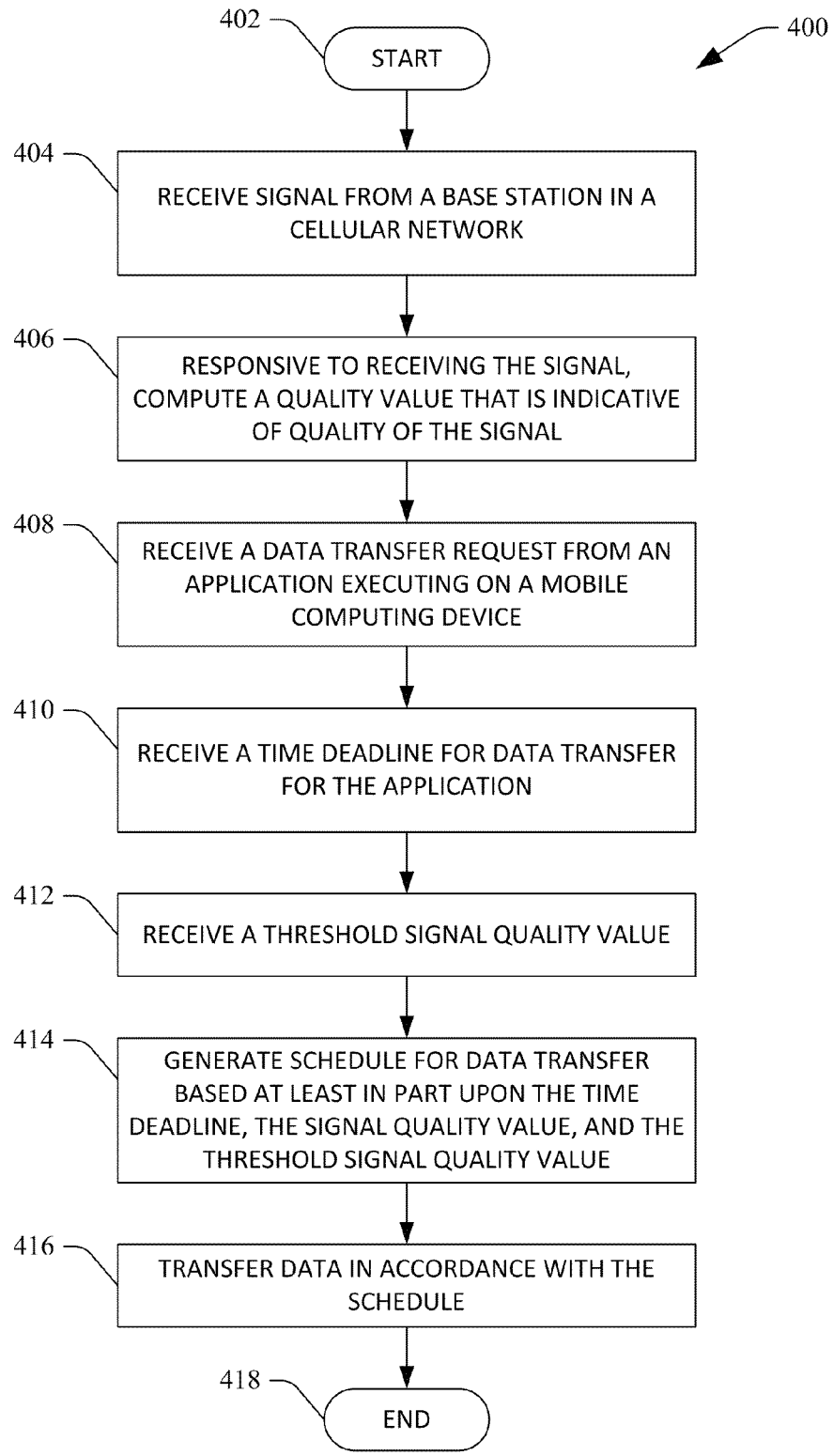
FIG. 4 is a flow diagram that illustrates an exemplary methodology for performing signal aware data transfer over a cellular network.
Figure 5:
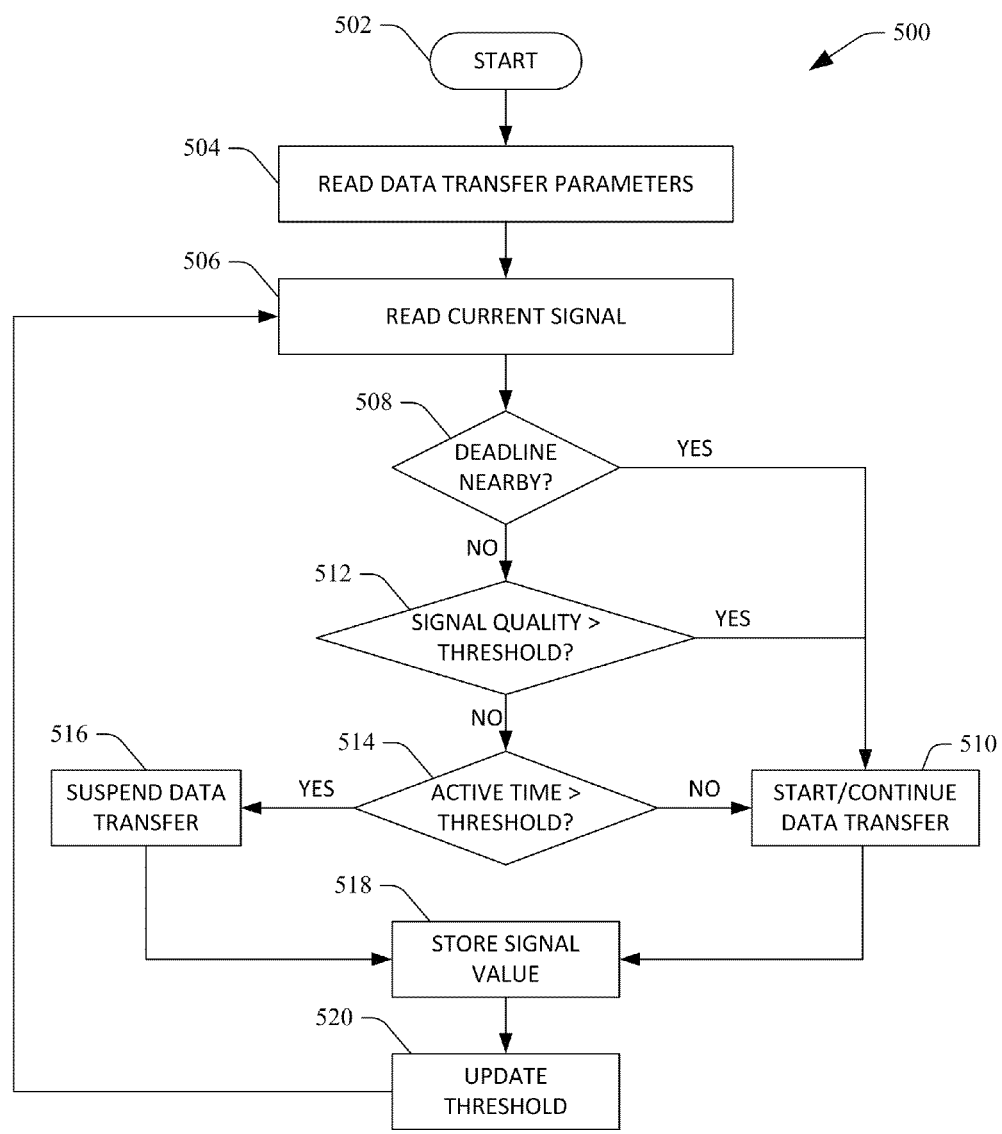
FIG. 5 is a flow diagram that illustrates an exemplary methodology that facilitates employing a threshold to perform signal aware data transfer over a cellular network.
Figure 6:
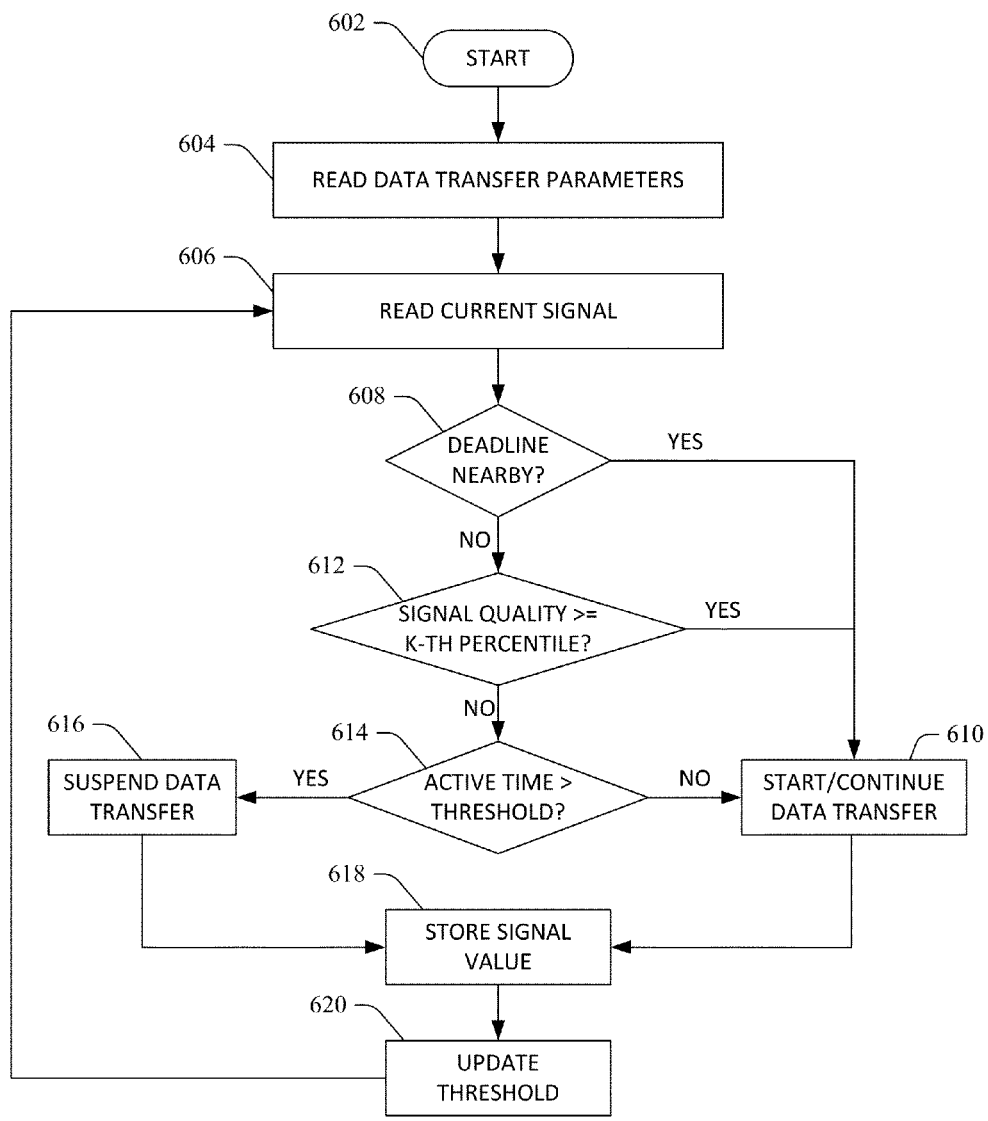
FIG. 6 is a flow diagram that illustrates an exemplary methodology for using a percentile-based threshold when scheduling data transfer over a cellular network.

With reference now to FIGS. 4-6, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagating signal.

Now referring to FIG. 4, an exemplary methodology 400 that facilitates transferring data between a mobile computing device and a base station in a cellular network based upon signal strengths observed at the mobile computing device is illustrated. Accordingly, the methodology 400 can be executed by the mobile computing device in the cellular network. The methodology 400 starts at 402, and at 404, a signal from a base station in the cellular network is received. At 406, responsive to receiving the signal, a quality value that is indicative of quality of the signal is computed. For example, this quality value can be a signal to noise ratio for the signal or some other metric that is indicative of strength or quality of the signal.

At 408, a data transfer request is received from an application executing on the mobile computing device. The data that is requested for transfer can be a download of data over the cellular network or an upload of data over the cellular network. At 410, a time deadline is received for completion of the data transfer requested by the application.

At 412, a threshold signal quality value is received, wherein the threshold signal quality value is based upon previously computed signal quality values that are indicative of qualities of respective signals previously received from at least one base station in the cellular network. At 414, transfer of the data is scheduled by way of a wireless radio in the mobile computing device based at least in part upon the time deadline, the signal quality value, and the threshold signal quality value. At 416, the data is transferred to or from the mobile computing device by way of the wireless radio in accordance with the schedule generated at 414. The methodology 400 completes at 418.

With reference now to FIG. 5, an exemplary methodology 500 that facilitates scheduling data transfer between a mobile computing device and a base station in a cellular network is illustrated. The methodology 500 is executed on the mobile computing device and performs the scheduling based upon an absolute threshold signal quality value. The methodology 500 starts at 502, and at 504 data transfer parameters are read, wherein the data transfer parameters pertain to a request for data transfer set forth by an application executing on the mobile computing device. In another exemplary embodiment, the data transfer parameters 504 can be computed based upon knowledge of operation of the application executing on the mobile computing device and/or throughput observed at various signal qualities computed at the mobile computing device. Accordingly, for example, the data transfer parameters read at 504 can include a number of data portions that are desirably subject to transfer (which can be computed), a size of the data portions, and a time deadline for each data portion.

At 506, a current signal received from the base station is read. As used in the methodology 500, reading the current signal from the base station includes computing a signal quality value that is indicative of quality of the signal.

At 508, a determination is made regarding whether the time deadline is within a threshold amount of time from a current time. In other words, at 508 a determination is made regarding whether the data transfer must be initiated or continued to meet the time deadline. If it is determined that the time deadline is nearby, then at 510, data transfer corresponding to the transfer request set forth by the application is initiated or continued. Thus, at 510, a processor on the mobile computing device can cause a wireless radio to one of become active to initiate a data transfer or to remain active.

If it is determined at 508 that the time deadline is not nearby, then at 512, a signal quality value for the signal read at 506 is compared to a threshold signal quality value. If it is determined that the signal quality value for the signal read at 506 is greater than the threshold signal quality value, then the methodology 500 continues to act 510 where data transfer is initiated or continued. In other words, if the signal quality is perceived to be relatively high, then transfer of data is scheduled to commence or continue. If, however, at 512, it is determined that the signal quality value for the signal read at 506 is below the threshold signal quality value, then at 514, a determination is made regarding whether an amount of time that the wireless radio has been active is greater than a threshold amount of time. If the amount of time that the wireless radio is active is not above the threshold amount of time, then the methodology 500 proceeds to act 510 where data transfer is continued. This ensures that the wireless radio is active for some threshold amount of time after a state of the wireless radio has been changed from idle to active. If, at 514, it is determined that the amount of time that the wireless radio has been active is greater than the threshold, then at 516 data transfer is suspended. Thus, the processor in the mobile computing device causes the wireless radio to become idle, for instance, using the fast dormancy protocol.

Subsequent to act 510 or act 516, at 518, the signal quality value for the signal read at 506 is retained in a computer-readable data storage device. At 520, the threshold signal quality value (used in the comparison of act 512) is updated based upon the signal quality value for the signal read at 506 and other historic signal values. The methodology than returns to 506, where another signal is read.

Now referring to FIG. 6, another exemplary methodology 600 that facilitates scheduling transfer of data at a mobile computing device over a cellular network is illustrated. The methodology 600 can be performed by the mobile computing device. In an exemplary embodiment, an operating system executing on the mobile computing device can be configured to perform acts of the methodology 600. The methodology 600 starts at 602, and at 604 data transfer parameters are read. Such data transfer parameters are similar to those described with respect to act 504 of the methodology 500. At 606, a current signal is read and a signal quality value of the current signal is computed. At 608, a determination is made regarding whether a time deadline is nearby. If the time deadline is found to be nearby, then at 610, transfer of data that is subject to the transfer request set forth by the application is commenced or continued.

If it is determined at 608 that the time deadline is not nearby, then at 612 a determination is made regarding whether the signal quality value for the signal read at 606 falls at or above the predefined percentile in a distribution of retained signal quality values for historically observed signals. In an example, at 612 a determination can be made regarding whether a signal quality value for the signal read at 606 is at or above a predefined percentile of historic signal quality values pertaining to at least one signal over, for instance, a threshold amount of time. If the signal quality value is found to lie in the distribution of historic values at or above the predefined percentile, then the methodology 600 continues to act 610.

If it is determined at 612 that the signal read at 606 is a relatively poor signal (the signal quality value for the signal read at 606 falls below the predefined percentile in the aforementioned distribution), then at 614 a determination is made regarding whether the wireless radio has been active for a threshold amount of time. If it is determined at 614 that the wireless radio has not been active for the threshold amount of time, than the methodology 600 proceeds to act 610 where the data transfer is continued.

If it is determined at 614 that the wireless radio has been active for the threshold amount of time, then at 616 a processor on the mobile computing device causes the wireless radio to become idle, for instance, using the fast dormancy protocol, and thus data transfer is suspended. Subsequent to acts 610 or 616, the methodology 600 proceeds to 618, where the signal quality value for the signal read at 606 is stored, and at 620 such signal value is employed in connection with updating the threshold utilized in the comparison undertaken at 612 (the distribution is updated).

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a mobile computing device in a cellular network, the method comprising:
   receiving a signal from a base station in the cellular network;
   responsive to receiving the signal, computing a signal quality value that is indicative of quality of the signal;
   receiving, from an application executing on the mobile computing device, an indication that the application requests transfer of data over the cellular network
   receiving a time deadline, wherein the transfer of data is to be completed prior to the time deadline, the time deadline being a time in the future;
   receiving a defined threshold value, the defined threshold value based upon previously computed signal quality values that are indicative of qualities of respective signals received from at least one base station in the cellular network;
   scheduling transfer of the data by way of a wireless radio in the mobile computing device based at least in part upon the signal quality value, the defined threshold value, and the time deadline; and
   transferring the data in accordance with the scheduling of the transfer of the data.

2. The method of claim 1, wherein the application executing on the mobile computing device is a web browser comprising a video player, and wherein the data is video data.

3. The method of claim 1, wherein the application executing on the mobile computing device is a video player that causes streaming video to be presented on display screen of the mobile computing device.

4. The method of claim 1, wherein the mobile computing device is one of a mobile telephone or a tablet computing device.

5. The method of claim 1, wherein the transfer of data is downloading of the data over the cellular network, the method further comprising computing the time deadline, wherein the time deadline is computed based at least in part upon a rate that the application consumes the data downloaded over the cellular network and throughput of the signal.

6. The method of claim 1, wherein an operating system executing on the mobile computing device performs the receiving of the indication, the receiving of the time deadline, the receiving of the defined threshold value, and the scheduling.

7. The method of claim 1, wherein the defined threshold value is an absolute value, and wherein the scheduling of the transfer of the data comprises:
   comparing the defined threshold value with the signal quality value; and
   one of:
      responsive to determining that the signal quality value is above the defined threshold value, causing the wireless radio to one of commence the transfer of the data or continue the transfer of the data; or
      responsive to determining that the signal quality value is below the defined threshold value, causing the wireless radio to one of become dormant or remain dormant.

8. The method of claim 1, wherein the defined threshold value is based upon a distribution of quality values of the previously computed quality values, wherein the defined threshold value is a percentile, and wherein the scheduling of the transfer of the data comprises:
   comparing the quality value with the distribution of quality values of the previously computed quality values; and
   one of:
      responsive to determining that the signal quality value lies above the percentile in the distribution of signal quality values of the previously computed quality values, causing the wireless radio to one of commence the transfer of the data or continue the transfer of the data; or
      responsive to determining that the signal quality value lies below the percentile in the distribution of signal quality values of the previously computed quality values, causing the wireless radio to one of become dormant or remain dormant.

9. The method of claim 1, further comprising:
   computing the time deadline; and computing the defined threshold value, wherein the time deadline and the defined threshold value are computed by way of the following algorithm:

$$E_S=(P_s \times T_s)+O_s,$$

where s is the defined threshold value, $E_s$ is an expected energy for the defined threshold value s, $P_s$ is an average power for a signal with signal quality s or higher, $T_s$ is an amount of time required to download the data, such that $$T_s = \frac{\text{download size}}{Tp_s},$$

where $Tp_s$ is an average throughput of a signal with signal quality s or higher and download size is a size of the data, $O_s$ is an amount of energy overhead due to tails, where $O_s=n_s \times E_t$, where $n_s$ is an expected number of tails and $E_t$ is a tail energy.

10. The method of claim 1, wherein the scheduling comprises:
transmitting a signal to the wireless radio of the mobile computing device that causes the wireless radio to commence the transfer of the data; and
causing the wireless radio of the mobile computing device to remain active for at least a threshold amount of time regardless of a quality of the signal.

11. A mobile computing device, comprising:
a wireless radio that is configured to transmit data to and receive data from a base station in a cellular network;
a processor in communication with the wireless radio;
a memory comprising:
an application that is executed by the processor, the application outputting a request for data that is accessible by way of the base station in the cellular network; and
a transfer scheduler component that, when executed by the processor, generates a schedule for receipt of the data over the wireless radio based at least in part upon a signal quality value, a time deadline, and a threshold value, the signal quality value being indicative of quality of a signal emitted from the base station as received by the wireless radio, the time deadline being indicative of a time prior to which the application is to be provided with the data, and the threshold value being indicative of a desired quality of the signal, the threshold value based upon signal quality values of respective signals emitted from at least one base station in the cellular network as received by the wireless radio, wherein the processor causes the wireless radio to one of immediately become active, remain active, immediately become idle, or idle dormant based at least in part upon the schedule.

12. The mobile computing device of claim 11 being one of a mobile telephone or a tablet computing device.

13. The mobile computing device of claim 11, wherein the processor is configured to enter an idle mode of operation, and wherein the wireless radio is configured to transmit a signal to the processor that causes the processor to become active when the signal quality value changes by a predefined threshold.

14. The mobile computing device of claim 11, wherein the data requested by the application is one of streaming video data, an operating system update, or an application update.

15. The mobile computing device of claim 11, wherein the transfer scheduler component compares the time deadline with the current time and ascertains that a difference between the time deadline and the current time is above a threshold, compares the signal quality value with the threshold value and ascertains that the signal quality value is above the threshold value, and generates the schedule based at least in part upon the difference between the time deadline and the current time being above the threshold and the signal quality value being above the threshold value, and wherein the processor causes the wireless radio to one of immediately become active or remain active based at least in part upon the schedule.

16. The mobile computing device of claim 11, wherein the transfer scheduler component compares the time deadline with the current time and ascertains that a difference between the time deadline and the current time is above a threshold, compares the signal quality value with the threshold value and ascertains that the signal quality value is below the threshold value, and generates the schedule based at least in part upon the difference between the time deadline and the current time being above the threshold and the quality value being below the threshold value, and wherein the processor causes the wireless radio to one of immediately become idle or remain idle based at least in part upon the schedule.

17. The mobile computing device of claim 16, wherein subsequent to the processor causing the wireless radio to one of immediately become idle or remain idle based at least in part upon the schedule, the transfer scheduler component compares the time deadline with the current time and ascertains that the difference between the time deadline and the current time is below the threshold and generates the schedule based at least in part upon the difference between the time deadline and the current time being below the threshold, and wherein the processor causes the wireless radio to immediately become active regardless of quality of the signal.

18. The mobile computing device of claim 16, wherein the transfer scheduler component periodically computes the threshold value based at least in part upon a threshold number of signal quality values for a threshold number of most recent signals emitted from the at least one base station as received at the mobile computing device.

19. The mobile computing device of claim 16, wherein the transfer scheduler component computes the time deadline based at least in part upon rate at which the application consumes data and data throughput values for respective signal quality values.

20. A mobile computing device comprising a computer-readable data storage device, the computer-readable data storage device comprising an operating system that is executed by a processor, the operating system, when executed by the processor, performing acts comprising:
computing a plurality of signal quality values for a respective plurality of signals emitted by at least one base station in a cellular network as observed at the mobile computing device, the plurality of signals emitted by the at least one base station observed at the mobile computing device over time;
computing a threshold signal quality value based at least in part upon the plurality of signal quality values;
receiving, from an application executing on the mobile computing device that is configured to present streaming video on a display screen of the mobile computing device, a request for streaming video data that is accessible by way of the cellular network;
computing a time deadline, the time deadline being indicative of a time prior to which the application is to be provided with streaming video data of a predefined size, the time deadline computed based at least in part upon:
a bitrate specified by the application;

the predefined size; and
a data throughput value corresponding to the cellular network;

computing a signal quality value for a signal from a base station in the cellular network currently observed at the mobile computing device;

determining if the time deadline is within a threshold amount of time from a current time;

if the time deadline is within the threshold amount of time from the current time, immediately causing a wireless radio in the mobile computing device to receive the streaming video data from the base station;

if the time deadline is outside the threshold amount of time from the current time, determining if the signal quality is above the threshold quality value;

if the signal quality is above the threshold quality value, immediately causing the wireless radio in the mobile computing device to receive the streaming video data from the base station; and if the signal quality is below the threshold quality value, immediately causing the wireless radio to suspend data transfer from the base station.

* * * * *